US012602558B2

(12) United States Patent
Van der Sijde et al.

(10) Patent No.: US 12,602,558 B2
(45) Date of Patent: Apr. 14, 2026

(54) AUTHENTICATION AND SECURE COMMUNICATION USING LED ARRAY

(71) Applicant: Lumileds Singapore Pte. Ltd.,
Singapore (SG)

(72) Inventors: Arjen Gerben Van der Sijde,
Eindhoven (NL); Nicola Bettina Pfeffer, Eindhoven (NL); Pieter Johannes Quintus van Voorst Vader, Eindhoven (NL)

(73) Assignee: Lumileds Singapore Pte. Ltd.,
Singapore (SG)

( * ) Notice: Subject to any disclaimer, the term of this patent is extended or adjusted under 35 U.S.C. 154(b) by 27 days.

(21) Appl. No.: 18/835,832

(22) PCT Filed: Feb. 1, 2023

(86) PCT No.: PCT/US2023/012114
§ 371 (c)(1),
(2) Date: Aug. 5, 2024

(87) PCT Pub. No.: WO2023/154202
PCT Pub. Date: Aug. 17, 2023

(65) Prior Publication Data
US 2025/0148238 A1     May 8, 2025

Related U.S. Application Data

(60) Provisional application No. 63/309,219, filed on Feb. 11, 2022.

(51) Int. Cl.
*G06K 7/14* (2006.01)
(52) U.S. Cl.
CPC .................................. *G06K 7/1404* (2013.01)

(58) Field of Classification Search
None
See application file for complete search history.

(56) References Cited

U.S. PATENT DOCUMENTS

| | | | | |
|---|---|---|---|---|
| 10,178,552 B2 * | 1/2019 | Yeom | .................. | H04W 12/068 |
| 11,120,427 B2 * | 9/2021 | Mullen | ............... | G06Q 20/352 |

(Continued)

FOREIGN PATENT DOCUMENTS

| | | |
|---|---|---|
| CN | 105308626 A | 2/2016 |
| CN | 103295284 B | 12/2016 |

(Continued)

OTHER PUBLICATIONS

"International Application Serial No. PCT/US2023/012114, International Search Report mailed Jun. 2, 2023", 3 pgs.

(Continued)

*Primary Examiner* — Thien M Le
*Assistant Examiner* — April A Taylor
(74) *Attorney, Agent, or Firm* — Schwegman, Lundberg & Woessner, P.A.

(57) ABSTRACT

In an authentication system, a housing can receive an optical data signal, such as a camera flash, from a user device, such as a smart phone. The optical data signal can include a plurality of beams propagating at different propagation angles from one another. At least one of the beams can include temporal modulation that corresponds to data. A lens disposed on or in the housing can at least partially focus the optical data signal onto a multi-pixel sensor such that the beams are at least partially focused onto different locations on the sensor. The sensor can produce an electrical data signal in response to the optical data signal. A controller can obtain the data from the electrical data signal, compare the data to reference data, determine that the data matches the (Continued)

reference data, and produce an authentication signal that indicates that the data matches the reference data.

20 Claims, 2 Drawing Sheets

(56) References Cited

U.S. PATENT DOCUMENTS

| | | | |
|---|---|---|---|
| 2005/0134723 A1 | 6/2005 | Lee et al. | |
| 2006/0014518 A1* | 1/2006 | Huh | H04M 15/06 |
| | | | 455/406 |
| 2006/0214815 A1 | 9/2006 | Komatsu | |
| 2018/0096593 A1 | 4/2018 | Davis | |
| 2019/0326988 A1 | 10/2019 | Mclaurin et al. | |
| 2020/0066141 A1* | 2/2020 | De Smet | F21V 33/0052 |

FOREIGN PATENT DOCUMENTS

| | | | |
|---|---|---|---|
| CN | 119013707 A | 11/2024 | |
| JP | 2010165313 A | 7/2010 | |
| KR | 20070111897 A | 11/2007 | |
| KR | 20180052877 A | 5/2018 | |
| WO | WO-2023154202 A1 | 8/2023 | |

OTHER PUBLICATIONS

"International Application Serial No. PCT/US2023/012114, Written Opinion mailed Jun. 2, 2023", 4 pgs.
"European Application Serial No. 23753332.8, Extended European Search Report mailed Jul. 28, 2025", 7 pgs.
"European Application Serial No. 23753332.8, Response to Communication Pursuant to Rules 161 and 162 EPC filed Dec. 3, 2024", 14 pgs.
"International Application Serial No. PCT/US2023/012114, International Preliminary Report on Patentability mailed Aug. 22, 2024", 6 pgs.
"European Application Serial No. 23753332.8, Response filed Dec. 17, 2025 to Extended European Search Report mailed Jul. 28, 2025", 12 pages.

* cited by examiner

*200*

202 — RECEIVE AN OPTICAL DATA SIGNAL

204 — FOCUS ONTO MULTI-PIXEL SENSOR

206 — PRODUCE ELECTRICAL DATA SIGNAL

208 — OBTAIN DATA FROM ELECTRICAL DATA SIGNAL

210 — COMPARE DATA TO REFERENCE DATA

212 — DETERMINE THAT DATA MATCHES REFERENCE DATA

214 — PRODUCE AUTHENTICATION SIGNAL

AUTHENTICATION AND SECURE COMMUNICATION USING LED ARRAY

CLAIM OF PRIORITY

This application is a U.S. National Stage Filing under 35 U.S.C. 371 from International Application No. PCT/US2023/012114, filed Feb. 1, 2023 and published in English as WO 2023/154202 on Aug. 17, 2023, which claims the benefit of U.S. Provisional Application No. 63/309,219, filed Feb. 11, 2022, each of which is hereby incorporated by reference in its entirety.

FIELD OF THE DISCLOSURE

The present disclosure relates to an authentication and security system, such as for unlocking a device, such as a door, a vehicle, or a screen of a computing device.

BACKGROUND OF THE DISCLOSURE

An authentication system can verify the identity of a user. There is ongoing effort to improve the security of authentication systems.

SUMMARY

In an example, an authentication system can include a housing configured to receive an optical data signal from a user device. The optical data signal can include a plurality of beams propagating at different propagation angles from one another. At least one of the plurality of beams can include temporal modulation that corresponds to data. The authentication system can include a multi-pixel sensor disposed in the housing. The authentication system can include a lens disposed on or in the housing. The lens can at least partially focus the optical data signal onto the multi-pixel sensor such that the plurality of beams are at least partially focused onto different locations on the multi-pixel sensor. The multi-pixel sensor can produce an electrical data signal in response to the optical data signal. The authentication system can include a controller. The controller can obtain the data from the electrical data signal. The controller can compare the data to reference data. The controller can determine that the data matches the reference data. The controller can, in response to determining that the data matches the reference data, produce an authentication signal that indicates that the data matches the reference data.

In an example, a method for performing authentication can include receiving an optical data signal from a user device. The optical data signal can include a plurality of beams propagating at different propagation angles from one another. At least one of the plurality of beams can include temporal modulation that corresponds to data. The method can include at least partially focusing the optical data signal onto a multi-pixel sensor such that the plurality of beams are at least partially focused onto different locations on the multi-pixel sensor. The method can include producing, with the multi-pixel sensor, an electrical data signal in response to the optical data signal. The method can include obtaining the data from the electrical data signal. The method can include comparing the data to reference data. The method can include determining that the data matches the reference data. The method can include, in response to determining that the data matches the reference data, producing an authentication signal that indicates that the data matches the reference data.

In an example, an authentication system can include a housing configured to receive an optical data signal from a camera flash of a smart phone. The optical data signal can include a plurality of beams propagating at different propagation angles from one another. At least one of the plurality of beams can include temporal modulation that corresponds to data. The authentication system can include a multi-pixel sensor disposed in the housing. The authentication system can include a lens disposed on or in the housing. The lens can at least partially focus the optical data signal onto the multi-pixel sensor such that the plurality of beams are at least partially focused onto different locations on the multi-pixel sensor. The multi-pixel sensor can produce an electrical data signal in response to the optical data signal. The authentication system can include a contact sensor disposed on or in the housing and configured to, when physically contacted by the smart phone, produce a contact signal. The authentication system can include a controller configured to, in response to receiving the contact signal: obtain the data from the electrical data signal; compare the data to reference data; determine that the data matches the reference data; and in response to determining that the data matches the reference data, produce an authentication signal that indicates that the data matches the reference data.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
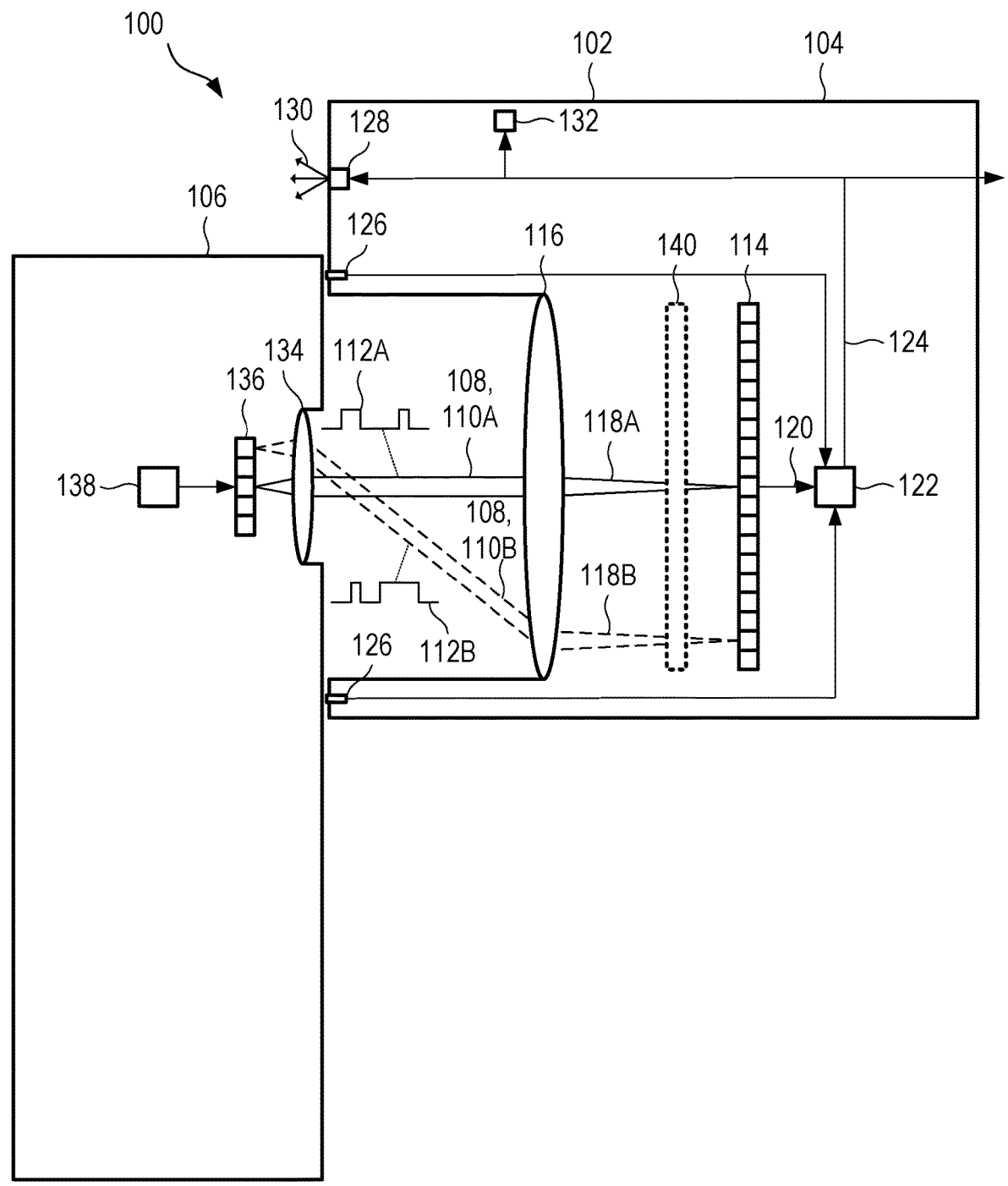
FIG. 1 shows a side view of an example of an authentication system, in accordance with some examples.

An authentication system can verify the identity of a user.

For example, a server can send data to a smart phone of a user. The smart phone can represent the data as a quick response (QR) code and can display the QR code on the display of the smart phone. A reader can scan the QR code. The reader can compare the QR code (or data represented by the QR code) to a specified QR code (or specified data) received from the server. If reader can confirm that the QR code (or data) the data matches the specified QR code (or the specified data), the reader can take a suitable action, such as providing a signal that instructs a lock to unlock a door or providing a visual indication and/or an audio indication that confirms an identity of the user.

There are potential drawbacks to display-based authentication, such as displaying and reading a QR code. For example, because the QR code is displayed on a device, a nefarious entity possessing a strategically located camera could potentially capture an image of the QR code, thereby intercepting the QR code and its associated data, and potentially compromising the security of the authentication system. There are similar risks of interception for wireless communication, such as near-field communication, like Bluetooth, and Wi-Fi.

As an alternative to display-based authentication, the authentication system and method described in detail below can use an optical data signal that may not be displayed as an image on a user device. Instead, the optical data signal can originate from a segmented light source, such as a light-emitting diode (LED) array. A lens can at least partially focus the light from the segmented light source, and can direct light from the LED array to propagate as a plurality of light beams that have different propagation angles from one another. The optical data signal can include a pattern formed by the LED array. The pattern can include data, such as an identification number, an account number, or a one-time security token. The pattern can optionally evolve in time. The time-evolving pattern can optionally include data encoded in the time-evolution. Because the authentication system and method described in detail below does not include using the display of a device to display data or a code, the authentication system and method described in detail below can have improved security over a display-based authentication system. Further, because the authentication system and method are not limited by a refresh rate of the display, the data rate achieved by the authentication system and method can be significantly greater than for a comparable display-based system.

In some examples, a camera flash on a smart phone can be used as the light source for the authentication system discussed in detail below.

The camera flash can vary a light intensity over an illumination field. For example, the camera flash can direct more light to objects in a scene that are relatively far from the camera, and less light to objects in the scene that are relatively close to the camera, so that both the far objects and the near objects can have suitable lighting for a captured image of the scene. As another example, vehicle headlights can dim a portion of the angular illumination field to avoid blinding drivers of oncoming vehicles. Other suitable examples and applications can also be used.

In some examples of illumination systems that can vary a light intensity over an illumination field, a lens can collimate (or at least partially focus) light from a light-emitting diode (LED) array, such as a segmented LED that has individually addressable segments that can be electrically powered independent of other segments. For the purposes of this document, the terms "LED array" and "segmented LED" are interchangeable, and the terms "LEDs" and "LED segments" are interchangeable.

The lens can direct light toward the scene, such that a particular location on the LED array can be directed in a particular angular orientation toward the scene. By varying electrical power sent to the LEDs of the LED array, the illumination system can dynamically adjust the illuminance over the illumination field. For illumination of a particular scene, the light propagating in a particular direction can correspond to a particular location in the scene. In other words, to dynamically adjust illumination intensities for locations within the scene, the illumination system can dynamically adjust electrical power sent to the various LEDs in the LED array.

The camera flash, which can vary the illuminance over an illumination field, can be used as a light source for the authentication system discussed in detail below.

In an example of an authentication system, a housing can receive an optical data signal, such as a camera flash, from a user device, such as a smart phone. The optical data signal can include a plurality of beams propagating at different propagation angles from one another. At least one of the beams can include temporal modulation that corresponds to data. A lens disposed on or in the housing can at least partially focus the optical data signal onto a multi-pixel sensor such that the beams are at least partially focused onto different locations on the sensor. The sensor can produce an electrical data signal in response to the optical data signal. A controller can obtain the data from the electrical data signal, compare the data to reference data, determine that the data matches the reference data, and produce an authentication signal that indicates that the data matches the reference data.

FIG. 1 shows a side view of an example of an authentication system 100, in accordance with some examples. The authentication system 100 can include a reader 102, which can include a housing 104 and various components in or on the housing 104. The reader 102 can receive information from a user device 106, such as a smart phone. During use, a user can hold the user device 106 and direct light from the user device 106 into the housing 104 of the reader 102. As such, the reader 102 may not include the user device 106. The authentication system 100 can include the reader 102 and any suitable user devices 106.

The authentication system 100 can include the housing 104. The housing 104 can receive an optical data signal 108 from a user device 106. The optical data signal 108 can include a plurality of beams 110A, 110B propagating at different propagation angles from one another.

At least one of the plurality of beams 110A, 110B can include temporal modulation 112A, 112B that corresponds to data, such as a security token. For example, beam 110A can include temporal modulation 112A that can encode data onto the beam 110A. Similarly, beam 110B can including temporal modulation 112B that can encode data onto the beam 110B. The data can be included in one beam, such as 110A or 110B, or can be distributed over multiple beams, such as both 110A and 110B.

In some examples, the temporal modulation 112A and/or 112B can include switching on or off a beam at a relatively slow data rate, such as 1 Hz (e.g., viewable with the naked eye). Such relatively slow temporal modulation can allow the beams to form a first pattern (e.g., a first subset of the beams being powered on), then a second pattern (e.g., a second subset of the beams being powered on, the second subset differing from the first subset), and so forth. The optical data signal 108 can be encoded in the sequence of patterns.

In some examples, the temporal modulation 112A and/or 112B can include switching on or off a beam at a relatively high data rate, such as 1 kHz (e.g., not viewable with the naked eye). For relatively high data rates, the temporal modulation 112A, 112B can include pulse-width modulation, or another suitable encoding/decoding scheme. In some examples, the temporal modulation 112A, 112B can be selected such that a time-averaged intensity level for each beam 110A, 110B has a specified value. In addition, the time-averaged intensity level can optionally be used to check an integrity of the data, such as with a check sum or other suitable redundant-data techniques. In some examples, the data rate can be higher than can be resolved by typical cameras. For example, a data rate of about 1 MHz can be resolved by a suitable sensor, but may not be resolved by a typical camera (e.g., with a refresh rate of 120 Hz or other suitable value) and may not be resolved by the human eye.

A multi-pixel sensor 114 can be disposed in the housing 104. In some examples, the multi-pixel sensor 114 can be sensitive to visible light (e.g., light in the visible portion of the electromagnetic spectrum, such as having a wavelength or wavelengths between about 400 nm and about 700 nm). The multi-pixel sensor 114 can produce a detectable signal when exposed to visible light.

In some examples, a number of pixels in the multi-pixel sensor 114 can be greater than a number of beams in the plurality of beams 110A, 110B. Using a multi-pixel sensor 114 with more pixels than beams can loosen tolerances on where a user can place the user device 106. For example, using significantly more pixels than beams, such as by a factor of about 10, about 100, or greater, can allow the user to position the user device 106 with any suitable azimuthal position (e.g., for a smart phone, the azimuthal position being a rotation in a plane of the smart phone).

A lens 116 can be disposed on or in the housing 104. The lens 116 can at least partially focus the optical data signal 108 onto the multi-pixel sensor 114 such that the plurality of beams 110A, 110B are at least partially focused (as respective converging beams 118A, 118B) onto different locations on the multi-pixel sensor 114. The multi-pixel sensor 114 can produce an electrical data signal 120 in response to the optical data signal 108.

A controller 122 obtain the data from the electrical data signal 120. The controller 122 can compare the data to reference data. For example, a server can supply the data for the electrical data signal, such as by sending a security token or other suitable data to the user device 106. The same server can send the reference data to the controller 122. The controller 122 can determine whether or not the data matches the reference data.

In response to determining that the data matches the reference data, the controller 122 can produce an authentication signal 124 that indicates that the data matches the reference data. In some examples, the authentication system 100 can supply the authentication signal 124 to a locking mechanism of a device to unlock the device. For example, the housing 104 can be positioned next to a door. When the controller 122 has determined that the data matches the reference data, the controller 122 can send the authentication signal 124 to a locking mechanism to unlock the door. Other suitable uses can include unlocking a computer, verifying an identity of a passenger, and others. Additional uses can be directed toward transferring data securely, such as from smart phone to smart phone, smart phone to laptop computer, laptop computer to smart phone, and others.

In some examples, a contact sensor 126 can be disposed on or in the housing 104. When physically contacted, the contact sensor 126 can direct the controller 122 to initiate obtaining the data from the electrical data signal 120. In some examples, the contact sensor 126 can sense physical contact from the user device 106, such as by a user holding a smart phone against one or more buttons that form the contact sensor 126. Using a contact sensor 126 in this manner can help ensure that the plurality of beams 110A, 110B can propagate only within a closed environment, such as the bounded volume between the user device 106 and the housing 104. Because the plurality of beams 110A, 110B can propagate only within a closed environment, and may not be displayed in an open-air environment, the optical data signal 108 may be more secure than a QR code (or other data) displayed on a display of a user device. In some examples, the authentication system 100 can be used a second factor in a two-factor authentication system.

In some examples, a visual indicator 128 can disposed on or in the housing 104. The visual indicator 128 can receive the authentication signal 124 and provide a visual indication 130 in response to receiving the authentication signal 124. In some examples, the visual indicator 128 can include a green light. When the controller 122 has determined that the data matches the reference data, the green light can turn on or flash. In some examples, the visual indicator 128 includes a red light. When the controller 122 has determined that the data does not match the reference data, the red light can turn on or flash. Other suitable visual indicators can also be used.

In some examples, an audio transducer 132 can be disposed on or in the housing 104. The audio transducer 132 can receive the authentication signal 124 and produce a sound in response to receiving the authentication signal 124. Other suitable indicators can also be used to alert a user that the data matches (or does not match) the reference data. In some examples, the audio transducer 132 can produce a first sound, such as a ping or a ring, when the data matches the reference data and a second sound, such as a buzzer, when the data does not match the reference data.

Thus far, the authentication system 100 has been described as having a user device 106 that can direct data, on an optical data signal 108, to a housing 104 of a reader 102. In some examples, the authentication system 100 can additionally direct data in the opposite direction, from the housing 104 to the user device 106. For some of these examples, at least one pixel of the multi-pixel sensor 114 can be forward biased to emit light as a forward-biased light-emitting diode. The controller 122 can further modulate the at least one pixel to produce second light that includes second data. The lens 116 can further direct the second light to the user device 106. In this manner, the second light can traverse essentially the same path as the optical data signal 108, with no additional components needed to produce, direct, or receive the second light. This traversal of the second light can be referred to as bidirectionality. Bidirectionality can be used for feedback to the user device 106, such as providing feedback for aligning the user device 106 to the housing 104, providing feedback to the user device 106 indicating that data has been properly received, and so forth. In some examples, the user device 106 can use a display of the user device 106 to provide an alert to the user. The alert can indicate that proper alignment has been achieved, that data has been properly received, and so forth.

In some examples, the user device 106 can be a smart phone. The smart phone can produce the optical data signal 108 from a camera flash on the smart phone. In some examples, the camera flash can include a collimating lens 134 having a focal plane. The camera flash can include a light-emitting diode array 136 disposed at or near the focal plane. The light-emitting diode array 136 can emit light through the collimating lens 134. The light from each light-emitting diode can form a respective beam of the plurality of beams 110A, 110B of the optical data signal 108. A user device controller 138 can receive the data from the server, and can encode the data onto the optical data signal 108 by selectively powering light-emitting diodes of the light-emitting diode array 136. Alternatively, the user device 106 can include a single light-emitting diode that is encoded with the data via temporal modulation.

In some examples, each light-emitting diode can emit excitation light at an excitation wavelength, such as in a blue or violet portion of the electromagnetic spectrum. Each light-emitting diode can include a phosphor that can absorb at least some of the excitation light and emit phosphor light having a phosphor wavelength greater than the excitation wavelength. In some examples, the user device controller 138 can modulate at least one of the light-emitting diodes at a data rate that is faster than a decay rate of the phosphor. In some examples, the authentication system 100 can further include an optional wavelength-sensitive filter 140 in an optical path between the lens 116 and the multi-pixel sensor 114. The wavelength-sensitive filter 140 can pass at least some of the excitation light to the multi-pixel sensor 114 and prevent at least some of the phosphor light from reaching the multi-pixel sensor 114. In some examples, the wavelength-sensitive filter 140 can absorb the phosphor light. In other examples, the wavelength-sensitive filter 140 can be a dichroic beamsplitter. In one geometry, the dichroic beamsplitter can reflect the phosphor light away from the multi-pixel sensor 114. In another geometry, the dichroic beamsplitter can direct the excitation light toward the multi-pixel sensor 114. Other suitable configurations can also be used.

In a specific example of an authentication system 100, a housing 104 can receive an optical data signal 108 from a camera flash of a smart phone. The optical data signal 108 including a plurality of beams 110A, 110B propagating at different propagation angles from one another. At least one of the plurality of beams 110A, 110B can include temporal modulation that corresponds to data. A multi-pixel sensor 114 can be disposed in the housing 104. A lens 116 can be disposed on or in the housing 104. The lens 116 can at least partially focus the optical data signal 108 onto the multi-pixel sensor 114 such that the plurality of beams 110A, 110B are at least partially focused onto different locations on the multi-pixel sensor 114. The multi-pixel sensor 114 can produce an electrical data signal 120 in response to the optical data signal 108. A contact sensor 126 can be disposed on or in the housing 104. When physically contacted by the smart phone, the contact sensor 126 can produce a contact signal. A controller 122 can, in response to receiving the contact signal, obtain the data from the electrical data signal 120, compare the data to reference data, determine that the data matches the reference data, and in response to determining that the data matches the reference data (or that the data is valid), produce an authentication signal 124 that indicates that the data matches the reference data.

In some examples, the camera flash can include a collimating lens 134 having a focal plane. The camera flash can include a light-emitting diode array 136 disposed at or near the focal plane. The light-emitting diode array 136 can emit light through the collimating lens 134. The light from each light-emitting diode can form a respective beam 110A, 110B of the plurality of beams 110A, 110B of the optical data signal 108.

Figure 2:
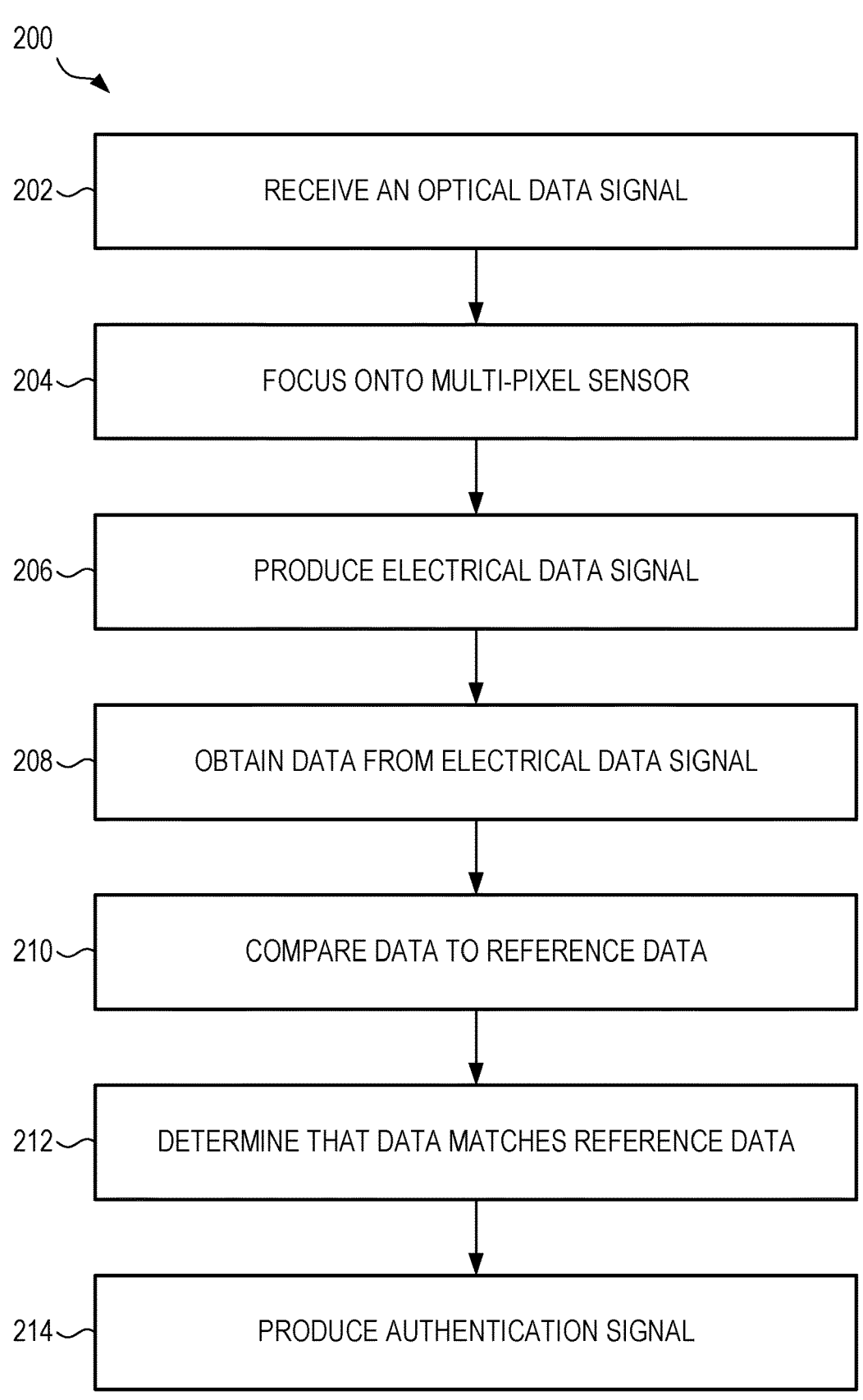
FIG. 2 shows a flowchart of an example of a method for performing authentication, in accordance with some examples.

FIG. 2 shows a flowchart of an example of a method 200 for performing authentication, in accordance with some examples. The method 200 can be executed by authentication system 100 or another authentication system. The method 200 for performing authentication is but one method for performing authentication; other suitable methods can also be used.

At operation 202, the system, such as authentication system 100, can receive an optical data signal, such as optical data signal 108, from a user device, such as user device 106. The optical data signal can include a plurality of beams, such as 110A, 110B, propagating at different propagation angles from one another. At least one of the plurality of beams 110A, 110B can include temporal modulation that corresponds to data.

At operation 204, the system can at least partially focus the optical data signal onto a multi-pixel sensor, such as multi-pixel sensor 114, such that the plurality of beams are at least partially focused onto different locations on the multi-pixel sensor.

At operation 206, the system can produce, with the multi-pixel sensor, an electrical data signal, such as electrical data signal 120, in response to the optical data signal.

At operation 208, the system can obtain the data from the electrical data signal.

At operation 210, the system can compare the data to reference data.

At operation 212, the system can determine that the data matches the reference data.

At operation 214, the system can, in response to determining that the data matches the reference data, produce an authentication signal, such as authentication signal 124, that indicates that the data matches the reference data.

In some examples, the method 200 can optionally further include sensing physical contact from a contact sensor, and, in response to sensing physical contact from the contact sensor, initiating obtaining the data from the electrical data signal.

In some examples, the method 200 can optionally further include, in response to determining that the data matches the reference data, providing a visual indication indicating that the data matches the reference data.

To further illustrate the systems and related methods disclosed herein, a non-limiting list of examples is provided below. Each of the following non-limiting examples can stand on its own or can be combined in any permutation or combination with any one or more of the other examples.

In Example 1, an authentication system can comprise: a housing configured to receive an optical data signal from a user device, the optical data signal including a plurality of beams propagating at different propagation angles from one another, at least one of the plurality of beams including temporal modulation that corresponds to data; a multi-pixel sensor disposed in the housing; a lens disposed on or in the housing, the lens configured to at least partially focus the optical data signal onto the multi-pixel sensor such that the plurality of beams are at least partially focused onto different locations on the multi-pixel sensor, the multi-pixel sensor configured to produce an electrical data signal in response to the optical data signal; and a controller configured to: obtain the data from the electrical data signal; compare the data to reference data; determine that the data matches the reference data; and in response to determining that the data matches the reference data, produce an authentication signal that indicates that the data matches the reference data.

In Example 2, the authentication system of Example 1 can optionally further comprise: a contact sensor disposed on or in the housing and configured to, when physically contacted, direct the controller to initiate obtaining the data from the electrical data signal.

In Example 3, the authentication system of any one of Examples 1-2 can optionally be configured such that the contact sensor is configured to sense physical contact from the user device.

In Example 4, the authentication system of any one of Examples 1-3 can optionally further comprise a visual indicator disposed on or in the housing, the visual indicator configured to receive the authentication signal and provide a visual indication in response to receiving the authentication signal.

In Example 5, the authentication system of any one of Examples 1-4 can optionally be configured such that the visual indicator includes a green light.

In Example 6, the authentication system of any one of Examples 1-5 can optionally further comprise an audio transducer disposed on or in the housing, the audio transducer configured to receive the authentication signal and produce a sound in response to receiving the authentication signal.

In Example 7, the authentication system of any one of Examples 1-6 can optionally be configured such that the authentication system is configured to supply the authentication signal to a locking mechanism of a device to unlock the device.

In Example 8, the authentication system of any one of Examples 1-7 can optionally be configured such that the data comprises a security token.

In Example 9, the authentication system of any one of Examples 1-8 can optionally be configured such that: the controller is configured to receive the reference data from a server; and the server is configured to supply the data for the electrical data signal.

In Example 10, the authentication system of any one of Examples 1-9 can optionally be configured such that: at least one pixel of the multi-pixel sensor is forward biased to emit light as a forward-biased light-emitting diode; the controller is further configured to modulate the at least one pixel to produce second light that includes second data; and the lens is further configured to direct the second light to the user device.

In Example 11, the authentication system of any one of Examples 1-10 can optionally be configured such that a number of pixels in the multi-pixel sensor is greater than a number of beams in the plurality of beams.

In Example 12, the authentication system of any one of Examples 1-11 can optionally be configured such that the user device is a smart phone configured to produce the optical data signal from a camera flash on the smart phone.

In Example 13, the authentication system of any one of Examples 1-12 can optionally be configured such that the camera flash includes: a collimating lens having a focal plane; and a light-emitting diode array disposed at or near the focal plane and configured to emit light through the collimating lens, the light from each light-emitting diode forming a respective beam of the plurality of beams of the optical data signal.

In Example 14, the authentication system of any one of Examples 1-13 can optionally be configured such that: the light-emitting diode array comprises light-emitting diodes, each light-emitting diode being configured to emit excitation light at an excitation wavelength, each light-emitting diode including a phosphor configured to absorb at least some of the excitation light and emit phosphor light having a phosphor wavelength greater than the excitation wavelength; and the authentication system further comprises a wavelength-sensitive filter in an optical path between the lens and the multi-pixel sensor, the wavelength-sensitive filter configured to pass at least some of the excitation light to the multi-pixel sensor and prevent at least some of the phosphor light from reaching the multi-pixel sensor.

In Example 15, the authentication system of any one of Examples 1-14 can optionally be configured such that the user device includes a user device controller configured to modulate at least one of the light-emitting diodes at a data rate that is faster than a decay rate of the phosphor.

In Example 16, a method for performing authentication can comprise: receiving an optical data signal from a user device, the optical data signal including a plurality of beams propagating at different propagation angles from one another, at least one of the plurality of beams including temporal modulation that corresponds to data; at least partially focusing the optical data signal onto a multi-pixel sensor such that the plurality of beams are at least partially focused onto different locations on the multi-pixel sensor, producing, with the multi-pixel sensor, an electrical data signal in response to the optical data signal; obtaining the data from the electrical data signal; comparing the data to reference data; determining that the data matches the reference data; and in response to determining that the data matches the reference data, producing an authentication signal that indicates that the data matches the reference data.

In Example 17, the method of Example 16 can optionally further comprise: sensing physical contact from a contact sensor; and in response to sensing physical contact from the contact sensor, initiating obtaining the data from the electrical data signal.

In Example 18, the method of any one of Examples 16-17 can optionally further comprise: in response to determining that the data matches the reference data, providing a visual indication indicating that the data matches the reference data.

In Example 19, an authentication system can comprise: a housing configured to receive an optical data signal from a camera flash of a smart phone, the optical data signal including a plurality of beams propagating at different propagation angles from one another, at least one of the plurality of beams including temporal modulation that corresponds to data; a multi-pixel sensor disposed in the housing; a lens disposed on or in the housing, the lens configured to at least partially focus the optical data signal onto the multi-pixel sensor such that the plurality of beams are at least partially focused onto different locations on the multi-pixel sensor, the multi-pixel sensor configured to produce an electrical data signal in response to the optical data signal; a contact sensor disposed on or in the housing and configured to, when physically contacted by the smart phone, produce a contact signal; and a controller configured to, in response to receiving the contact signal: obtain the data from the electrical data signal; compare the data to reference data; determine that the data matches the reference data; and in response to determining that the data matches the reference data, produce an authentication signal that indicates that the data matches the reference data.

In Example 20, the authentication system of Example 19 can optionally be configured such that the camera flash includes: a collimating lens having a focal plane; and a light-emitting diode array disposed at or near the focal plane and configured to emit light through the collimating lens, the light from each light-emitting diode forming a respective beam of the plurality of beams of the optical data signal.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An authentication system, comprising:
   a housing configured to receive an optical data signal from a user device, the optical data signal including a plurality of beams propagating at different propagation angles from one another, at least one of the plurality of beams including temporal modulation that corresponds to data;
   a multi-pixel sensor disposed in the housing;
   a lens disposed on or in the housing, the lens configured to at least partially focus the optical data signal onto the multi-pixel sensor such that the plurality of beams is at least partially focused onto different locations on the multi-pixel sensor, the multi-pixel sensor configured to produce an electrical data signal in response to the optical data signal; and
   a controller configured to:
      obtain the data from the electrical data signal;
      compare the data to reference data;
      determine that the data matches the reference data; and in response to determining that the data matches the reference data, produce an authentication signal that indicates that the data matches the reference data.

2. The authentication system of claim 1, further comprising:
a contact sensor disposed on or in the housing and configured to, when physically contacted, direct the controller to initiate obtaining the data from the electrical data signal.

3. The authentication system of claim 2, wherein the contact sensor is configured to sense physical contact from the user device.

4. The authentication system of claim 1, further comprising a visual indicator disposed on or in the housing, the visual indicator configured to receive the authentication signal and provide a visual indication in response to receiving the authentication signal.

5. The authentication system of claim 4, wherein the visual indicator includes a green light.

6. The authentication system of claim 1, further comprising an audio transducer disposed on or in the housing, the audio transducer configured to receive the authentication signal and produce a sound in response to receiving the authentication signal.

7. The authentication system of claim 1, wherein the authentication system is configured to supply the authentication signal to a locking mechanism of a device to unlock the device.

8. The authentication system of claim 1, wherein the data comprises a security token.

9. The authentication system of claim 1, wherein:
the controller is configured to receive the reference data from a server; and
the server is configured to supply the data for the electrical data signal.

10. The authentication system of claim 1, wherein:
at least one pixel of the multi-pixel sensor is forward biased to emit light as a forward-biased light-emitting diode;
the controller is further configured to modulate the at least one pixel to produce second light that includes second data; and
the lens is further configured to direct the second light to the user device.

11. The authentication system of claim 1, wherein a number of pixels in the multi-pixel sensor is greater than a number of beams in the plurality of beams.

12. The authentication system of claim 1, wherein the user device is a smart phone configured to produce the optical data signal from a camera flash on the smart phone.

13. The authentication system of claim 12, wherein the camera flash includes:
a collimating lens having a focal plane; and
a light-emitting diode array disposed at or near the focal plane and configured to emit light through the collimating lens, the light from each light-emitting diode forming a respective beam of the plurality of beams of the optical data signal.

14. The authentication system of claim 13, wherein:
the light-emitting diode array comprises light-emitting diodes, each light-emitting diode being configured to emit excitation light at an excitation wavelength, each light-emitting diode including a phosphor configured to absorb at least some of the excitation light and emit phosphor light having a phosphor wavelength greater than the excitation wavelength; and the authentication system further comprises a wavelength-sensitive filter in an optical path between the lens and the multi-pixel sensor, the wavelength-sensitive filter configured to pass at least some of the excitation light to the multi-pixel sensor and prevent at least some of the phosphor light from reaching the multi-pixel sensor.

15. The authentication system of claim 14, wherein the user device includes a user device controller configured to modulate at least one of the light-emitting diodes at a data rate that is faster than a decay rate of the phosphor.

16. A method for performing authentication, the method comprising:
receiving an optical data signal from a user device, the optical data signal including a plurality of beams propagating at different propagation angles from one another, at least one of the plurality of beams including temporal modulation that corresponds to data;
at least partially focusing the optical data signal onto a multi-pixel sensor such that the plurality of beams are at least partially focused onto different locations on the multi-pixel sensor;
producing, with the multi-pixel sensor, an electrical data signal in response to the optical data signal;
obtaining the data from the electrical data signal;
comparing the data to reference data;
determining that the data matches the reference data; and
in response to determining that the data matches the reference data, producing an authentication signal that indicates that the data matches the reference data.

17. The method of claim 16, further comprising:
sensing physical contact from a contact sensor; and
in response to sensing physical contact from the contact sensor, initiating obtaining the data from the electrical data signal.

18. The method of claim 16, further comprising:
in response to determining that the data matches the reference data, providing a visual indication indicating that the data matches the reference data.

19. An authentication system, comprising:
a housing configured to receive an optical data signal from a camera flash of a smart phone, the optical data signal including a plurality of beams propagating at different propagation angles from one another, at least one of the plurality of beams including temporal modulation that corresponds to data;
a multi-pixel sensor disposed in the housing;
a lens disposed on or in the housing, the lens configured to at least partially focus the optical data signal onto the multi-pixel sensor such that the plurality of beams are at least partially focused onto different locations on the multi-pixel sensor, the multi-pixel sensor configured to produce an electrical data signal in response to the optical data signal;
a contact sensor disposed on or in the housing and configured to, when physically contacted by the smart phone, produce a contact signal; and
a controller configured to, in response to receiving the contact signal:
obtain the data from the electrical data signal;
compare the data to reference data;
determine that the data matches the reference data; and
in response to determining that the data matches the reference data, produce an authentication signal that indicates that the data matches the reference data.

20. The authentication system of claim 19, wherein the camera flash includes:

a collimating lens having a focal plane; and a light-emitting diode array disposed at or near the focal
plane and configured to emit light through the colli-
mating lens, the light from each light-emitting diode
forming a respective beam of the plurality of beams of
the optical data signal.

* * * * *